United States Patent
Matthys et al.

(10) Patent No.: US 11,635,145 B1
(45) Date of Patent: *Apr. 25, 2023

(54) HYDRAULIC COMPONENTS AND METHODS OF MANUFACTURING

(71) Applicant: Garlock Sealing Technologies, LLC, Palmyra, NY (US)

(72) Inventors: Randy Matthys, Palmyra, NY (US); Chad Yoder, Palmyra, NY (US); Michael McNally, Palmyra, NY (US); Louis Mattina, Palmyra, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,658

(22) Filed: Sep. 17, 2021

Related U.S. Application Data

(63) Continuation of application No. 16/105,590, filed on Aug. 20, 2018, now Pat. No. 11,143,305.

(60) Provisional application No. 62/548,725, filed on Aug. 22, 2017.

(51) Int. Cl.
| | |
|---|---|
| *F16J 15/20* | (2006.01) |
| *F04B 53/16* | (2006.01) |
| *F16J 15/26* | (2006.01) |
| *F16J 15/16* | (2006.01) |
| *F16J 15/3268* | (2016.01) |
| *F04B 53/22* | (2006.01) |

(52) U.S. Cl.
CPC ............. *F16J 15/20* (2013.01); *F04B 53/164* (2013.01); *F16J 15/166* (2013.01); *F16J 15/26* (2013.01); *F04B 53/22* (2013.01); *F16J 15/3268* (2013.01)

(58) Field of Classification Search
CPC ....... F04B 53/164; F04B 53/22; F16J 15/166; F16J 15/20; F16J 15/26; F16J 15/3268
See application file for complete search history.

(56) References Cited

U.S. PATENT DOCUMENTS

| | | |
|---|---|---|
| 1,473,597 A | 11/1923 | Mastin |
| 2,151,096 A | 3/1939 | Freelander |
| 2,859,061 A | 11/1958 | Reid |
| 2,953,398 A | 9/1960 | Haugen et al. |
| 3,013,830 A | 12/1961 | Milligan |
| 3,419,280 A | 12/1968 | Wheeler |
| 3,469,854 A | 9/1969 | Linwood |
| 3,554,563 A | 1/1971 | Schumacher et al. |
| 4,138,144 A | 2/1979 | Pierce, Jr. |

(Continued)

FOREIGN PATENT DOCUMENTS

| | | |
|---|---|---|
| WO | WO2001006086 A1 | 1/2001 |
| WO | WO2011117602 A2 | 9/2011 |

OTHER PUBLICATIONS

Office Action dated Sep. 20, 2011, by the USPTO, regarding U.S. Appl. No. 12/347,207, 10 pages.

(Continued)

*Primary Examiner* — Gilbert Y Lee
(74) *Attorney, Agent, or Firm* — Perkins Coie LLP

(57) ABSTRACT

A spiral wound header ring is provided. The spiral wound header ring comprises at least one outer fabric layer and at least one spiral of inner fabric and rubber. The spiral wound header ring further may have a sealing surface that extends from a rearward facing surface to the forward facing annular, radially extending, surface.

20 Claims, 5 Drawing Sheets

(56) References Cited

U.S. PATENT DOCUMENTS

| | | | |
|---|---|---|---|
| 4,214,761 A | 7/1980 | Pippert | |
| 4,270,761 A | * 6/1981 | Hertz, Jr. | ............ E21B 33/1208 |
| | | | 428/36.1 |
| 4,310,163 A | 1/1982 | Pippert | |
| 4,421,330 A | 12/1983 | Burke | |
| 4,440,404 A | 4/1984 | Roach et al. | |
| 4,510,994 A | 4/1985 | Pringle | |
| 4,526,385 A | 7/1985 | Wheeler | |
| 4,729,432 A | 3/1988 | Helms | |
| 4,823,882 A | 4/1989 | Stokley et al. | |
| 4,848,463 A | 7/1989 | Ringgenberg et al. | |
| 4,893,678 A | 1/1990 | Stokley et al. | |
| 5,065,493 A | * 11/1991 | Ozora | ................. F01N 13/1811 |
| | | | 156/194 |
| 5,297,805 A | 3/1994 | Merkin et al. | |
| 5,462,121 A | 10/1995 | Schmuck et al. | |
| 5,676,384 A | * 10/1997 | Culpepper | .......... E21B 33/1216 |
| | | | 277/342 |
| 5,951,022 A | 9/1999 | Gorman et al. | |
| 5,960,700 A | 10/1999 | Staggs et al. | |
| 6,105,596 A | * 8/2000 | Hoyes | ...................... F16J 15/30 |
| | | | 277/540 |
| 6,817,228 B2 | 11/2004 | Upton et al. | |
| 6,907,936 B2 | 6/2005 | Fehr et al. | |
| 7,108,067 B2 | 9/2006 | Themig et al. | |
| 7,124,824 B2 | 10/2006 | Turner et al. | |
| 7,134,505 B2 | 11/2006 | Fehr et al. | |
| 7,322,417 B2 | 1/2008 | Rytlewski et al. | |
| 7,377,321 B2 | 5/2008 | Rytlewski | |
| 7,503,392 B2 | 3/2009 | King et al. | |
| 7,543,634 B2 | 6/2009 | Fehr et al. | |
| 7,628,210 B2 | 12/2009 | Avant et al. | |
| 7,644,772 B2 | 1/2010 | Avant et al. | |
| 7,681,650 B2 | 3/2010 | Telfer et al. | |
| D631,142 S | 1/2011 | Angell | |
| 7,861,774 B2 | 1/2011 | Fehr et al. | |
| 8,181,972 B2 | 5/2012 | Tsuji | |
| 8,215,401 B2 | 7/2012 | Braekke et al. | |
| 8,261,761 B2 | 9/2012 | Gerrard et al. | |
| 8,356,670 B2 | 1/2013 | Telfer | |
| 8,397,820 B2 | 3/2013 | Fehr et al. | |
| 8,479,822 B2 | 7/2013 | Hofman et al. | |
| 8,479,823 B2 | 7/2013 | Mireles | |
| 8,540,019 B2 | 9/2013 | Hofman et al. | |
| 8,668,013 B2 | 3/2014 | O'Connell et al. | |
| 8,783,365 B2 | 7/2014 | McCoy et al. | |
| 8,789,600 B2 | 7/2014 | O'Connell et al. | |
| 9,534,691 B2 | 1/2017 | Miller et al. | |
| 9,845,801 B1 | 12/2017 | Shek | |
| 2006/0213670 A1 | 9/2006 | Bishop et al. | |
| 2007/0017679 A1 | 1/2007 | Wolf et al. | |
| 2007/0278017 A1 | 12/2007 | Shen et al. | |
| 2008/0066924 A1 | 3/2008 | Xu | |
| 2009/0166980 A1 | 7/2009 | Miller et al. | |
| 2009/0308588 A1 | 12/2009 | Howell et al. | |
| 2011/0278017 A1 | 11/2011 | Themig et al. | |
| 2012/0048556 A1 | 3/2012 | O'Connell et al. | |
| 2012/0210868 A1 | 8/2012 | Miller et al. | |
| 2013/0068475 A1 | 3/2013 | Hofman et al. | |
| 2013/0118732 A1 | 5/2013 | Chauffe | |
| 2013/0133876 A1 | 5/2013 | Naedler et al. | |
| 2013/0248201 A1 | 9/2013 | Jackson | |
| 2013/0330220 A1 | 12/2013 | Miller et al. | |
| 2013/0333891 A1 | 12/2013 | Fripp et al. | |
| 2016/0129448 A1 | 5/2016 | Andersson et al. | |

OTHER PUBLICATIONS

Office Action dated Dec. 12, 2011, by the USPTO, regarding U.S. Appl. No. 12/347,207, 8 pages.

* cited by examiner

HYDRAULIC COMPONENTS AND METHODS OF MANUFACTURING

CROSS-REFERENCE TO RELATED PATENT APPLICATIONS

The present application is a continuation of U.S. patent application Ser. No. 16/105,590, filed Aug. 20, 2018, titled "Hydraulic Components and Methods of Manufacturing," which claims priority to U.S. Provisional Patent Application No. 62/548,725, filed Aug. 22, 2017, titled "Hydraulic Components and Methods of Manufacturing," which is incorporated herein by reference as if set out in full.

BACKGROUND

Many fluid systems have pumps, valves, rams, etc. (generically "fluid equipment") that provide for reciprocal or rotating movement of a piston rod, valve stem, or the like (hereinafter referred to generically as a "rod"). The surface of the rod provides a leak path between the high-pressure side and the low-pressure side of the fluid equipment. To inhibit leakage, the rods move through stuffing boxes having packing or packing rings. The packing forms a seal with the rod to inhibit leakage and the like.

One popular stuffing box configuration was originally introduced by Garlock, Inc. (now known as Garlock Sealing Technologies, LLC.) in the 1960's and is the subject matter of U.S. Pat. No. 3,013,830, the disclosure of which is incorporated herein by reference as if set out in full. The stuffing box or packing assembly of U.S. Pat. No. 3,013,830 provides one or more fabric wrapped pressure seals that have a V-shape or Chevron shape. The pressure seal comprises a core of material, such as a homogeneous elastomeric or polymeric material or a fabric reinforced elastomeric or polymeric material, which is typically rubber or fiber reinforced rubber, whether natural or synthetic. The core of rubber is subsequently wrapped with an outer fabric. U.S. Pat. No. 3,013,830 provides that the one or more fabric wrapped pressure seals are typically stacked on an adapter ring that facilitates providing a compression force to seal the one or more fabric wrapped pressure seals against the rod.

U.S. Pat. No. 4,440,404, issued to Halliburton Company, which is incorporated herein by reference as if set out in full, modified the stuffing box assembly of U.S. Pat. No. 3,013,830. U.S. Pat. No. 4,440,404 introduced a header ring with an inwardly radially extending convex sealing surface. The inwardly radially extending convex sealing surface acted as a seal and wiper against the rod to inhibit leakage from the fluid medium and inhibited particles carried in the fluid medium from contacting the one or more fabric wrapped pressure seals stacked behind the header ring reducing wear due to abrasion and the like.

Unfortunately, the systems of today operate at high pressures with very corrosive fluids (both chemically and mechanically corrosive). Thus, the header ring is exposed to a harsh operating environment that results in wear on the header ring. In particular, the elastomeric header ring of U.S. Pat. No. 4,440,404 experiences wear at the junction between the pedestal or heel of the header ring and the inwardly radially extending convex sealing surface. To resist wear, it would have been obvious to either load the rubber of the header ring with reinforcing fiber, to wrap the elastomeric header ring with a fabric similar to the one or more pressure seals described above, or a combination thereof.

None of these options, however, is entirely satisfactory. To load the elastomeric core or rubber core with sufficient fiber reinforcement to withstand today's pressures and media, the header ring becomes over stiff. Moreover, simply placing fabric around the header ring has been unsatisfactory as the header ring still suffers from less than optimal performance.

Thus, against the above background, a new core different than a homogenous elastomeric core or a fiber reinforced elastomeric core is needed.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In certain aspects of the technology, a header ring is provided. The header ring is formed using a spiral winding technique to form a spiral wound header ring. The header ring includes at least one outer layer of fabric that envelops a core. The core comprises at least one inner layer of fabric, and a rubber or polymer layer. The rubber or polymer layer may include, among other things, fiber reinforcement. In at least one embodiment, the outer layer of fabric is integral with the inner layer of fabric.

In certain embodiments, the header ring comprises a forward facing annular, radially extending surface having an inner diameter edge and a sealing surface having an annular, radially and axially extending, convex sealing surface having a forward facing edge. The inner diameter edge and the forward facing edge abut, which eliminates the conventional junction of current header rings and reduces nibbling. In certain aspects, the inner diameter edge and the forward facing edge abut to form an obtuse angle. The obtuse angle is generally between about 100 and 130 degrees. In certain embodiments, the obtuse angle is between about 115 and 125 degrees. In still other embodiments, the obtuse angle is about 120 degrees. In certain aspects, the annular, radially and axially extending, convex sealing surface comprises at least one radius of curvature. In other aspects, the annular, radially and axially extending, convex sealing surface comprises a plurality of radii of curvature. In still other aspects, the annular, radially and axially extending, convex sealing surface comprises at one linear portion.

The technology of the present application also provides a method for making a header ring. The method for making the header ring includes providing a first layer wherein the first layer comprises a fabric and a second layer on the first layer wherein the second layer comprises a rubber. The construct or composite of the first and second layers are rolled to form a cylinder of material that is cut to an appropriate length. The cut cylinder of material is placed into a mold and formed into a header ring, when the mold is subsequently removed. In certain aspects the second layer is provided on only a portion of the first layer, which allows rolling of the cylinder to have a plurality of outer layers of fabric.

The technology of the present application provides for a packing system including at least one pressure ring and a header ring. The header ring including a plurality of outer fabric layers and a header ring core enveloped by the plurality of outer fabric layers, wherein the plurality of outer fabric layers and the header ring core form a shape. The header ring includes an annular, radially extending forward facing surface having an inner diameter edge and an outer diameter edge. An annular, axially extending surface having a forward facing edge and a rearward facing edge where the forward facing edge abuts the outer diameter edge of the annular, radially extending forward facing surface. At least one annular and radially extending rearward pressure ring surface having an outer diameter edge and an inner diameter edge where the outer diameter edge abuts the rearward facing edge of the annular, axially extending surface. At least one sealing surface radially and axially extending having a rearward edge and a forward edge wherein the rearward edge abuts the inner diameter edge of the at least one annular and radially extending rearward pressure ring surface and the forward edge abuts the inner diameter edge of the annular, radially extending forward facing surface. The header ring core comprises at least one fabric layer and at least one polymer layer.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to stuffing boxes associated with reciprocating pumps. However, the technology described herein may be used for other fluid equipment, such as for example, valves, rams, and the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
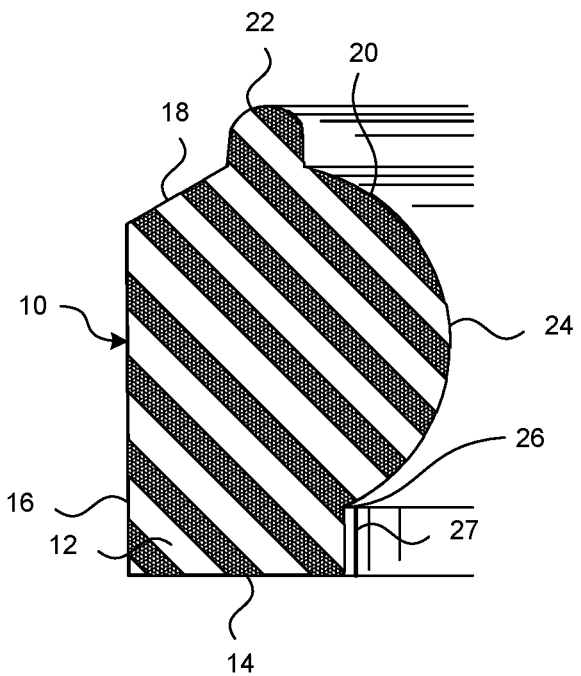
FIG. 1 is a cross section of a prior art annular header ring.

With reference now to FIG. 1, a cross section of an uncompressed prior art annular header ring 10 is provided. The annular header ring 10 conventionally comprises a homogeneous rubber or polymer material, or a fiber reinforced rubber or polymer material. The annular header ring 10 includes a pedestal or heel portion 12 with a forward facing flat annular, radially extending, surface 14. For purposes of the present technology, forward facing generally means the high pressure side and rearward facing generally means the low pressure side. The annular header ring 10 further includes an annular, axially extending, stuffing box surface 16. An annular, axially extending, surface 16 generally engages the cylindrical surface of the stuffing box. The rearward facing surfaces of the header ring 10 are generally formed by annular, axially and radially extending, pressure ring surfaces 18 and 20 that converge at a bead 22. An annular, radially and axially extending, convex sealing surface 24 extends from annular, axially and radially extending, surface 20, which terminates at a junction 26. An annular, axially extending, pedestal surface 27 originates at junction 26 and extends axially to the forward facing flat annular, radially extending, surface 14. As can be appreciated, the annular, axially and radially extending, pressure ring surface 20 has a smooth transition to the annular, axially and radially extending, convex sealing surface 24. The annular, axially and radially extending, pressure ring surfaces 18 and 20 may be flat surfaces or convex surfaces. The bead 22 generally aligns with the V in the apex of the pressure seal that is stacked on the header ring 10. If a bead 22 is not used, there may exist a contiguous surface from the annular, axially extending, surface 16 to the annular, radially and axially extending, convex sealing surface 24.

Figure 2:
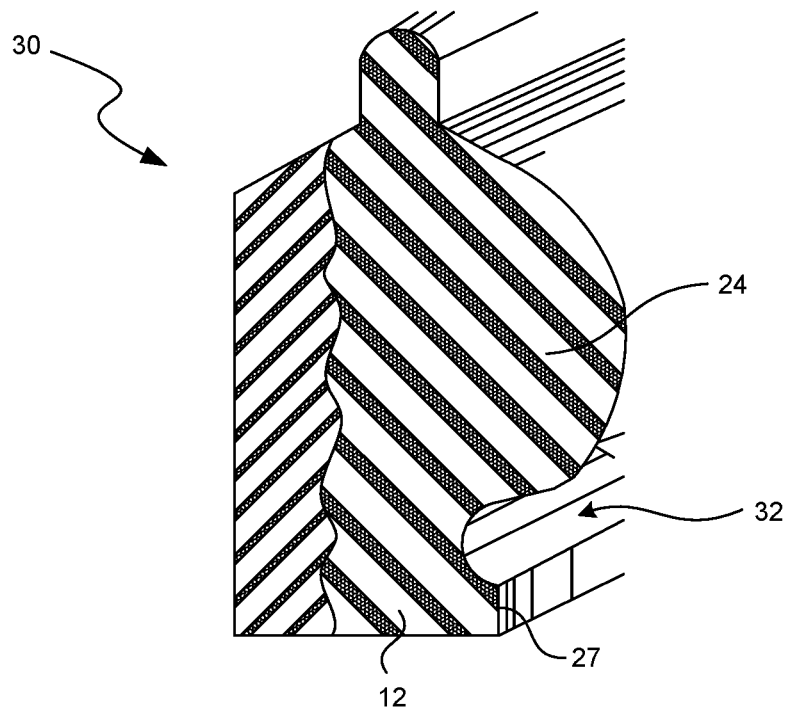
FIG. 2 is a cross section of a prior art annular header ring after use.

With reference now to FIG. 2, a cross section of another conventional annular header ring 30 is provided. The annular header ring 30 is similar to header ring 10, but representative of the annular header ring 10 after operation in, for example, a stuffing box. Conventionally, the header ring 30 comprises a homogeneous rubber or polymer material, a fiber reinforced rubber or polymer material, or a combination of both. The view of FIG. 2 shows a header ring having both a fiber reinforced portion and a non-fiber reinforced portion. The annular header ring includes the pedestal or heel portion 12 and the annular, radially and axially extending, convex sealing surface 24. The junction, however, has been worn away to form area 32 due to corrosion. The area 32 represents the aforementioned corrosion, or nibbling as it is conventionally known. Nibbling generally involves corrosion due to the fluid media and particulate in the fluid media being in contact with the junction 26 originally and area 32 as the nibbling occurs, which is in part due to the fact that the header ring 30 functions in part as a wiper to prevent particulate and, to a lesser extent, fluid media from contacting the one or more fabric wrapped pressure seals.

Figure 3:
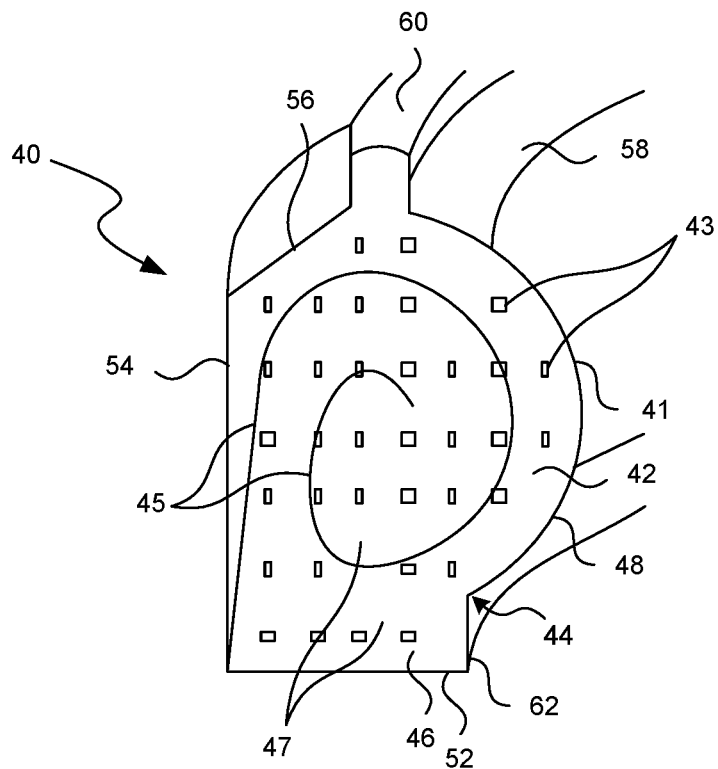
FIG. 3 is a cross section of an annular header ring consistent with the technology of the present application.
Figure 8:
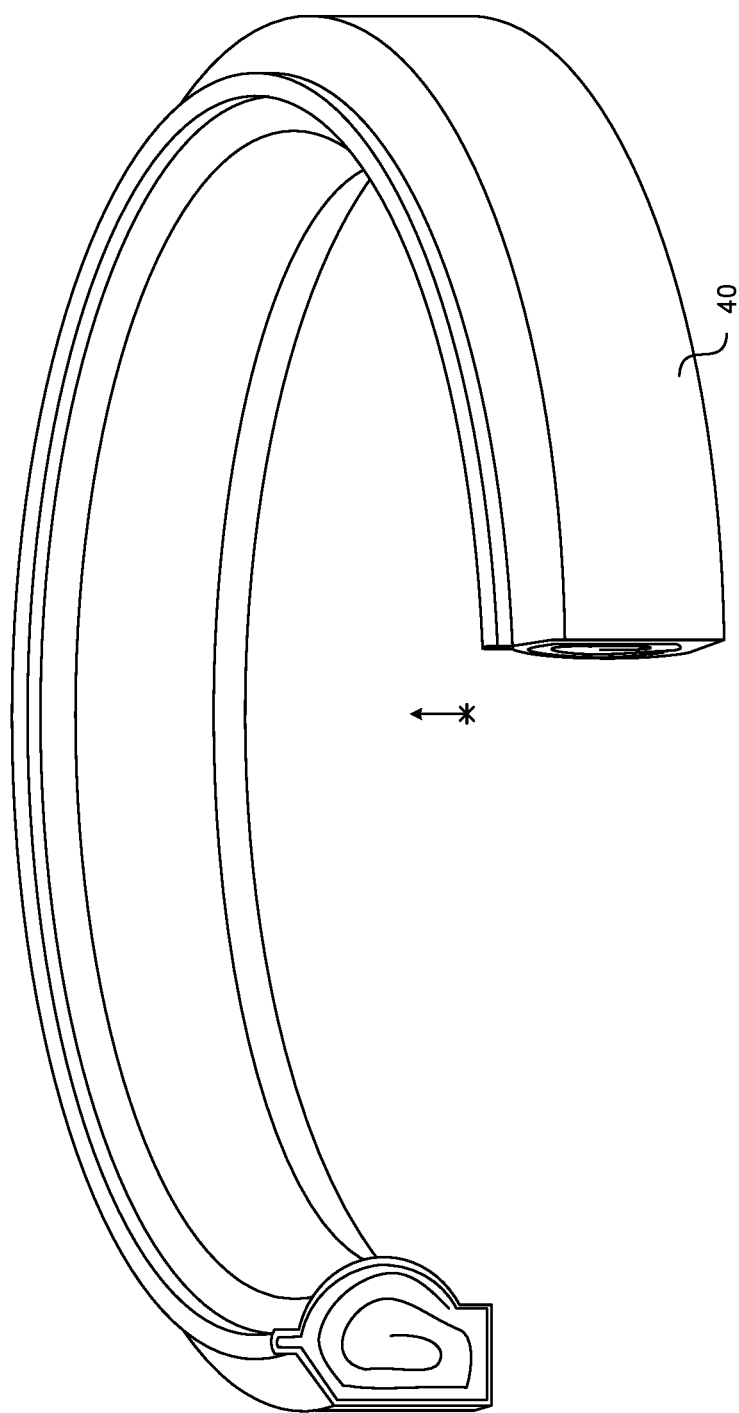
FIG. 8 is a perspective view of the annular header ring consistent with the technology of the present application with a portion removed to view the internal cross section.

As mentioned above, various obvious attempts to reduce the wear on header rings such as header rings 10 and 30 have been less than satisfactory. Thus, the technology herein provides an improved header ring. FIG. 3 shows a cross section of an uncompressed annular header ring 40 consistent with the technology of the present application. Annular header ring 40 is shown in FIG. 8 as well. For consistency, the uncompressed annular header ring 40 is similar in general shape to the conventional header rings 10 and 30 described above. The annular header ring 40 comprises a spiral wound material 42 comprising a fabric layer and a rubber layer, as described further below. The rubber layer may or may not be reinforced for higher pressures. Alternating layers of rubber and fabric increases the mechanically stability of the sealing element. The sealing element may be the header ring 40 and other header rings described herein, but the sealing element also may be the one or more fabric wrapped pressure seals described above. The spiral wound material 42 may, optionally, include a fiber reinforcement 43 as shown. The spiral wound material 42 generally has a hardness in a durometer range of about 60 Shore A to 60 Shore D. The spiral wound material 42 comprises a ring of an internally spiral wrapped material that comprises a rolled fabric and rubber sheet, which can be seen in the spiral wound material 42 as fabric 45 and rubber 47. The fabric layer may be a woven or a non-woven fabric. As can be appreciated in the figure, the outer layer of the annular header ring 40 is a fabric layer of fabric 45. Typically, there are several fabric layers of fabric 45 prior to the introduction of the rubber 47. The fabric layers of fabric 45 on the outer layer may be referred to as the outer fabric. The fabric layers of fabric 45 wound between the rubber may be considered inner fabric. The combination of rubber and inner fabric may be referred to as a core or the core of the header ring. The outer fabric and inner fabric are typically the same material but may be different material. In certain embodiments, the material may be a metal reinforcement material rather than a textile. Additionally, the fabric layer may comprise organic or inorganic substances with non-specific weight by volume. The rubber layer is generically described as rubber, but could be comprised of other polymers, such as a fluoropolymer or the like.

The annular header ring 40 as shown in FIG. 3 has a junction 44 between the pedestal or heel portion 46 and the sealing surface 48. The internal fabric layers 45 of the spiral wound material 42 greatly increases the ability of annular header ring 40 to withstand the high pressure and high abrasion associated with many fluid systems today. Additionally, the use of spiral wound material 42 in annular header ring 40 increases the ability of the ring to reduce the effects of pressure hammering and allows the ring to recover rapidly so as not to induce excessive movement of the entire packing set that may or may not cause premature wear of the stuffing box of a pump, valve, or ram, which premature wear is known in the industry as washboarding.

For completeness, the annular header ring 40 has a pedestal or heel portion 46 with a forward facing annular, radially extending, surface 52. An annular, axially extending, surface 54 extends along the cylindrical wall of the stuffing box. The rearward facing surfaces of the header ring 40 are generally formed by annular, axially and radially extending, pressure ring surfaces 56 and 58 that converge at a bead 60. An annular, radially and axially extending, convex sealing surface 48 extends from annular, axially and radially extending, surface 58, which terminates at a junction 44. An annular, axially extending, pedestal surface 62 originates at junction 44 and extends axially to the forward facing flat annular, radially extending, surface 52. Optionally, the annular header ring may further include an outer layer 41 over any portion thereof. In a preferred embodiment, the outer layer 41 encompasses the entire annular header ring 40. The outer layer 41 may be an external layer or layers of frictioned rubber, which is a fabric that has been smeared with rubber, typically through a calendaring process, other fabrics, or a combination thereof.

Figure 4:
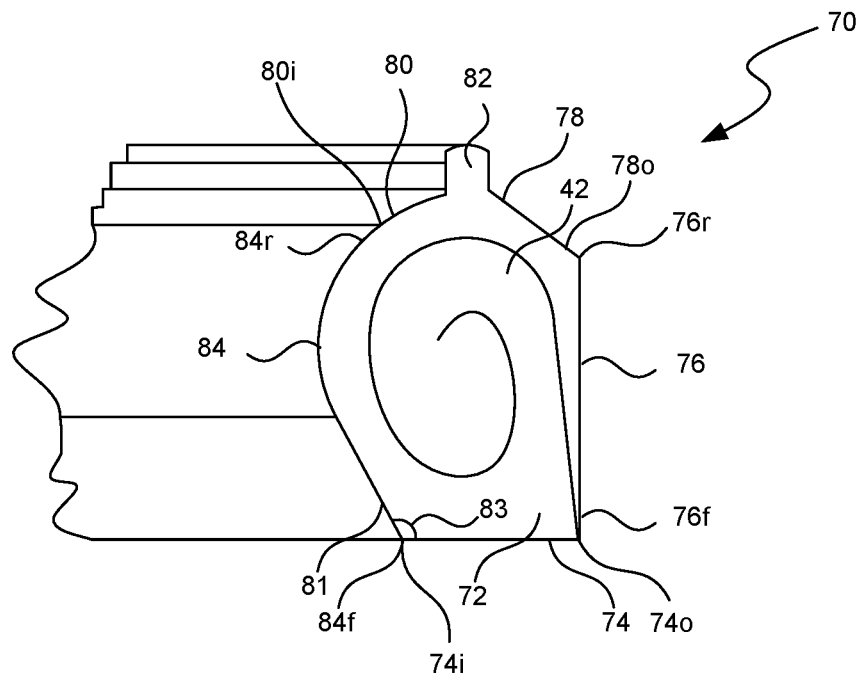
FIG. 4 is a cross section of an annular header ring consistent with the technology of the present application.
Figure 9:
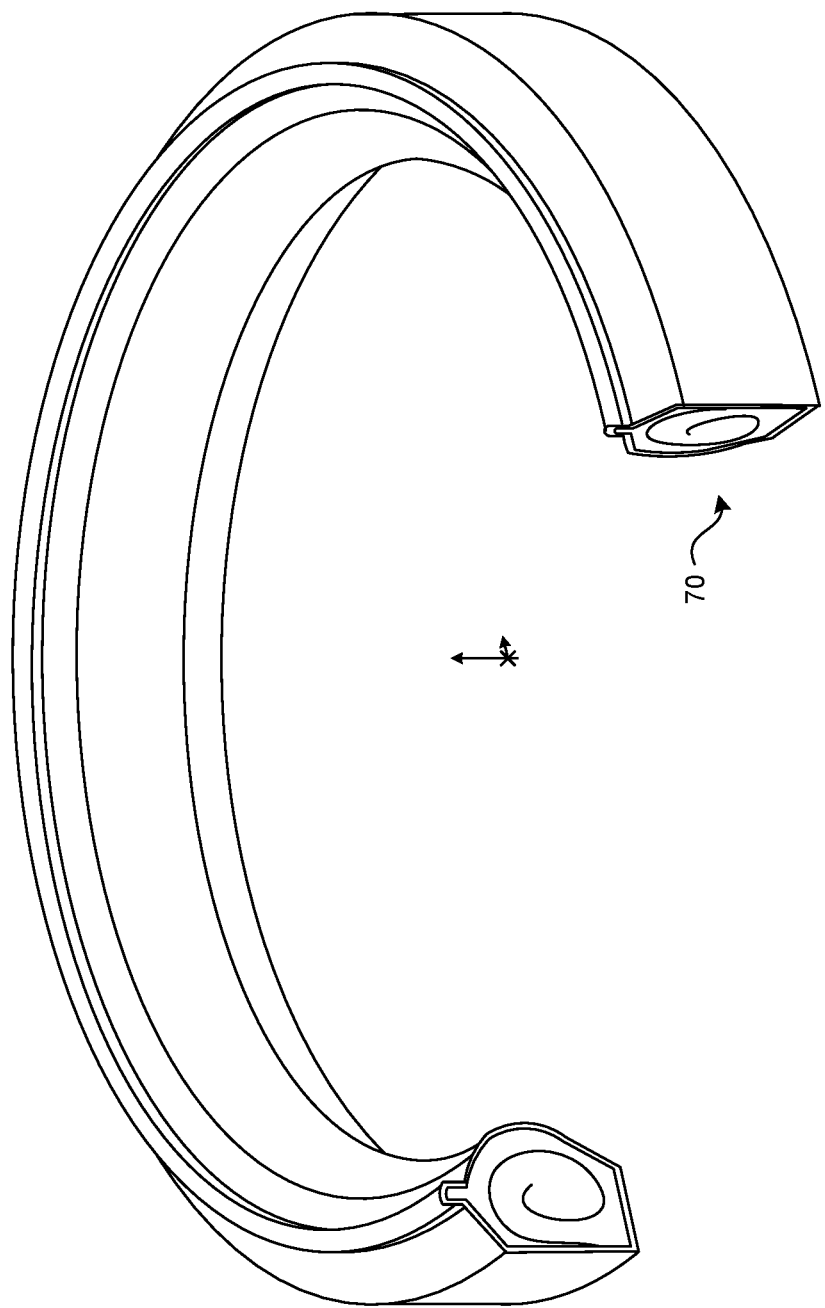
FIG. 9 is a perspective view of the annular header ring consistent with the technology of the present application with a portion removed to view the internal cross section.

As mentioned above, the junction 44 provides a location for wear. The wear is due to a high stress concentration after the installation of the annular header ring 40 in a stuffing box. FIGS. 4 and 9 show an annular header ring 70 having the spiral wound material 42 that eliminates the junction 44 to remove the location of high stress. The annular header ring 70 is shown where the spiral wound material 42 does not include fiber reinforcement 43. Thus, while similar to annular header ring 40, annular header ring 70 will be further explained herein. Annular header ring 70 comprises a forward facing portion 72 with a forward facing annular, radially extending, surface 74. The forward facing annular, radially extending, surface 74 includes an inner diameter edge 74i and an outer diameter edge 74o. An annular, axially extending, surface 76 extends along the cylindrical wall of the stuffing box. The annular, axially extending, surface 76 includes a forward facing edge 76f and a rearward facing edge 76r. The rearward facing surfaces of the header ring 70 are generally formed by annular, axially and radially extending, pressure ring surfaces 78 and 80 that converge at a bead 82. The rearward facing surfaces include an inner diameter edge 80i and an outer diameter edge 78o. An annular, radially and axially extending, convex sealing surface 84 extends from annular, axially and radially extending, pressure ring surface 58, to the annular, radially extending, surface 74, which eliminates the junction 44 of annular header ring 40. The annular, radially and axially extending, convex sealing surface 84 includes a rearward facing edge 84r and a forward facing edge 84f. The annular, radially and axially extending, convex sealing surface 84 may have a single radius of curvature from surface 80 to surface 74 or, as shown, may have a plurality of radii. As shown, the annular, radially and axially extending, convex sealing surface 84 may transition to a portion that becomes a linear surface 82, as shown, that tapers or angles on the forward facing portions of the annular, radially and axially extending, convex sealing surface 62. Certain portions of the header ring 70 (and header ring 40) may be described herein as abutting. Abutting may mean two or more portions directly touch or two or more portions touch with intervening portions between the abutting portions. When provided, the linear surface 81 forms an obtuse angle 83 with the annular, radially extending, surface 74. The obtuse angle may be between about 100° and 130° typically, but is preferably between 115° and 125°, and even more preferably approximately 120°. Note the angle of contact is heavily dependent on the hardness of the rubber. As the rubber durometer increases, the contact angle decreases. Approximately 120° degrees is the target for 75 Shore A rubber. In the context, approximately means within ±1°. Also, the actual meeting of surface 81 and surface 74 may be chamfered or rounded.

Providing the annular header ring 70 with a linear surface 82 reduces or eliminates the nibbling and premature failure associated with conventional header rings. The structure of the overall design provides less body roll, which is the rotation of the sealing element as the reciprocating stem moves. By stiffening the ring it rotates less, and also engages the pressure ring above it axially. The annular header ring also has less nibbling, improved sealing, and improved excluding, which means in the art that the header ring 70 excludes particulates that are in the media, which is often different than the media. The annular header ring also has improved recovery and less shuttling (which is a term of art in the industry relating to movement of the overall packing assembly).

Figure 5:
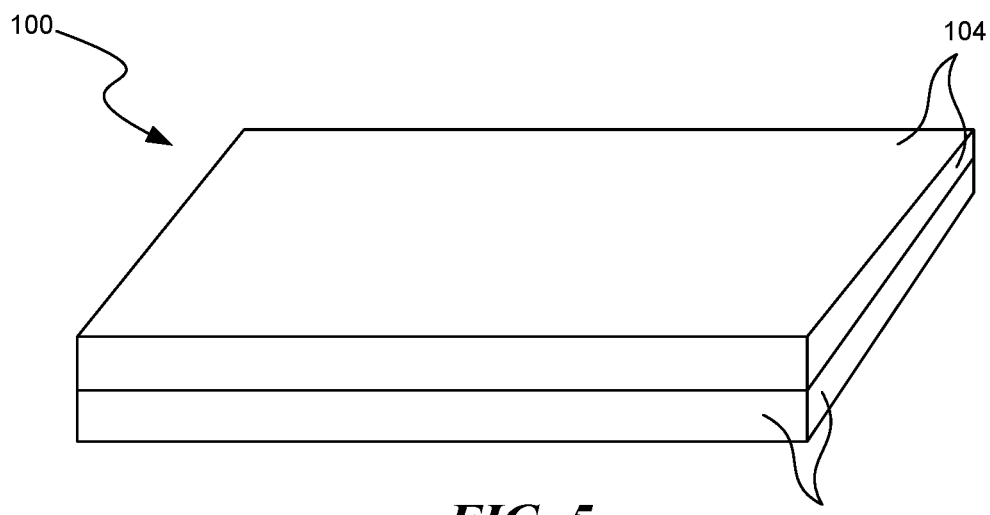
FIG. 5 is a perspective view of a sheet of material consistent with the technology of the present application.
Figure 6:
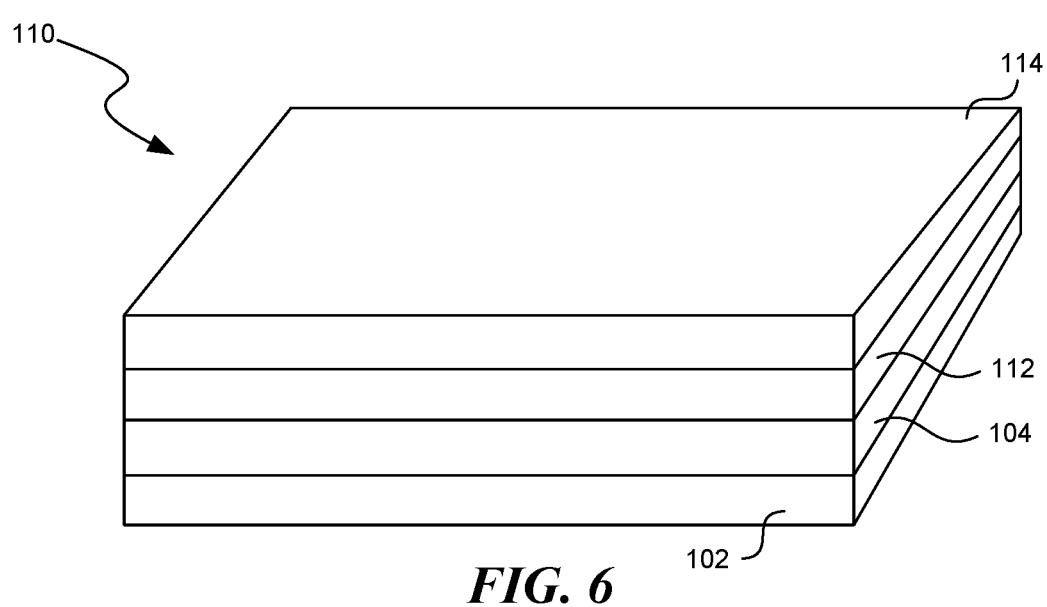
FIG. 6 is a perspective view of a sheet of material consistent with the technology of the present application.

With reference now to FIG. 5, a sheet 100 of the spiral wound material 42 is shown prior to being formed into an annular header ring, such as annular header rings 40, 70. The sheet 100 comprises a first layer 102 of fabric and a second layer 104 of a rubber or polymer material. While the second layer 104 of a rubber or polymer material is shown as spread over the entire surface of the first layer 102, the rubber or polymer material may be spread over less than the entire first layer 102 of fabric, which allows the outer fabric to be several fabric layers of fabric 45. When the second layer 104 is smeared or spread over less than the entire first layer 102, there is typically at least one edge where the first layer and the second layer are aligned. Generally, the first layer of fabric is between about 0.02 inches to 0.06 inches prior, with no rubber. The fabric may be, for example, a woven cotton fabric. The second layer 104 may be reinforced with fibers 106, such as cotton, polyester, aramid fibers, or the like. The final thickness of rubber and fabric sheets ranges from about 0.080 inches to 0.160 inches. FIG. 6 shows an alternative sheet 110 of the spiral wound material 42. The sheet 110 comprises a first layer 102 of fabric, a second layer 104 of a rubber or polymer material, a third layer 112 of fabric, and a fourth layer 114 of a rubber or polymer material. While only two examples are shown, the sheet of material used to make the spiral wound material may have any number of layers of fabric separated by layers of rubber or polymer.

Figure 7:
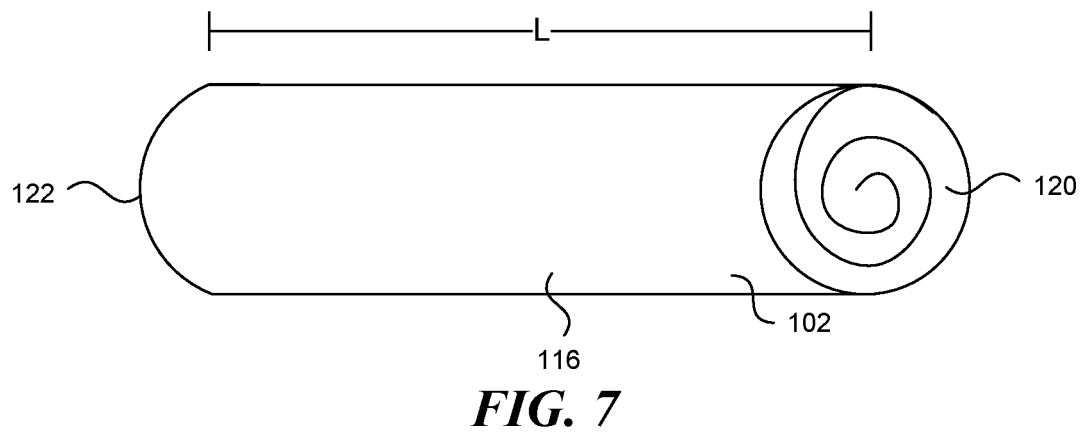
FIG. 7 is a view of a sheet of material rolled to form a cylinder consistent with the technology of the present application.

After obtaining a sheet of the spiral wound material 42, the sheet is rolled into a cylinder 116 (or a tube 116) as shown in FIG. 7 with the fabric layer 102 on the exposed outer surface 118 of the tube. If the second layer 104 is not fully spread on the first layer 102 (or fabric layer 102), at least an edge of the composite typically has a portion where the first layer 102 and second layer 104 are aligned. The cylinder is rolled from this end to provide the alternative fabric, rubber layering of a spiral wounding and a series of fabric layers stacked on the core of the header ring. The cylinder 116 may be cut to an appropriate length L. The cylinder 116 having a length L would be formed into a preform or mold for the annular header ring 40, 70 (or a pressure seal ring). While the annular header rings 40 and 70 have particular cross sectional shapes, the mold for the header ring may take any shape including, for example, a circular cross sectional shape, a V cross sectional shape, a chevron cross sectional shape, an elliptical cross sectional shape, a rectangular cross sectional shape, or other non-uniform or polygon shapes as required for the design. As can be appreciated, while described with respect to an annular header ring, the various shapes provide that the hydraulic component may be used as the header ring, a pressure ring, or other part of a stuffing box whether for a pump, valve, or ram. Generally, the ends 120 and 122 of the cylinder 116 abut in the mold. The part is next molded, typically under heat and pressure of about 275 F to 400 F and from 200 to 2500 PSI, to cure the spiral wound material 42. Once formed, the part is removed from the mold and trimmed as necessary to form the part, such as annular header ring 40, 70.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. A header ring, comprising:
an annular, axially extending outer surface;
a forward facing portion with an annular forward facing radially extending surface having an inner diameter edge operatively coupled to the annular axially extending outer surface opposite the inner diameter edge;
a rearward facing portion operatively coupled to the annular, axially extending surface opposite the forward facing portion and extending at least radially to an inner diameter edge;
an annular, radially and axially extending, convex sealing surface extending from the inner diameter edge of the rearward facing portion continuously to the inner diameter edge of the forward facing portion;
at least one outer layer of fabric; and
a spiral wound core contained by the at least one outer layer of fabric,
the spiral wound core comprising:
at least one inner layer of fabric, and
a rubber layer.

2. The header ring of claim 1, wherein the at least one outer layer of fabric comprises a plurality of outer layers of fabric.

3. The header ring of claim 2 wherein the at least one inner layer of fabric is integrally coupled to the at least one outer layer of fabric.

4. The header ring of claim 1 wherein the at least one inner layer of fabric comprises a plurality of inner layers of fabric and the rubber layer comprises a plurality of rubber layers interspersed between each of the plurality of inner layers of fabric.

5. The header ring of claim 1 wherein the rubber is fiber reinforced rubber.

6. The header ring of claim 1 wherein the annular, radially and axially extending, convex sealing surface comprises at least one radius of curvature.

7. The header ring of claim 6 wherein the annular, radially and axially extending, convex sealing surface comprises at least one linear portion.

8. The header ring of claim 7 wherein the linear portion forms an obtuse angle with the forward facing annular, radially extending surface.

9. The header ring of claim 8 wherein the obtuse angle is between 100 and 130 degrees.

10. A method of making a header ring comprising:
providing a first layer wherein the first layer comprises a fabric;

providing a second layer on the first layer wherein the second layer comprises a rubber;

rolling the first layer and the second layer to form a cylinder of material;

cutting the cylinder of material to a length;

placing the cut cylinder of material into a mold;

forming the header ring; and removing the mold.

11. The method of claim 10 wherein the second layer is provided only on a portion of the first layer.

12. The method of claim 11 wherein rolling the first layer and the second layer to form a cylinder of material comprises starting the rolling at an edge where the first layer and the second layer are aligned.

13. The method of claim 10 wherein providing the second layer comprises smearing the first layer of fabric with the second layer of rubber.

14. A packing system for a compressor pump including at least one pressure ring and at least one header ring, the header ring for the compressor pump comprising:

a plurality of outer fabric layers;

a header ring core enveloped by the plurality of outer fabric layers, wherein the plurality of outer fabric layers and the header ring core form a shape for the header ring comprising:

an annular, radially extending forward facing surface having an inner diameter edge and an outer diameter edge;

an annular, axially extending surface having a forward facing edge and a rearward facing edge where the forward facing edge is operatively coupled to the outer diameter edge of the annular, radially extending forward facing surface;

at least one annular and radially extending rearward pressure ring surface having an outer diameter edge and an inner diameter edge where the outer diameter edge is operatively coupled to the rearward facing edge of the annular, axially extending surface; and a continuous sealing surface radially and axially extending having a rearward facing edge and a forward facing edge wherein the rearward facing edge is operatively coupled to the inner diameter edge of the at least one annular and radially extending rearward pressure ring surface and the forward facing edge is operatively coupled to the inner diameter edge of the annular, radially extending forward facing surface; and wherein the header ring core comprises at least one fabric layer and at least one polymer layer.

15. The packing system of claim 14 wherein the polymer layer is selected from a group of polymers consisting of: natural rubber, synthetic rubber, or a combination thereof.

16. The packing system of claim 15 wherein the polymer layer comprises a fiber reinforced polymer.

17. The packing system of claim 14 comprising an obtuse angle formed where the forward edge of the at least one sealing surface abuts the inner diameter edge of the annular, radially extending forward facing surface.

18. The packing system of claim 17 wherein the obtuse angle is between about 100 and 130 degrees.

19. The packing system of claim 18 wherein the at least one sealing surface comprises at least one radius of curvature.

20. The packing system of claim 19 wherein the at least one sealing surface comprises at least one linear portion.

* * * * *